United States Patent [19]

Shenk

[11] Patent Number: 4,531,822

[45] Date of Patent: Jul. 30, 1985

[54] EXTENDED SONIC ACCEPTANCE ANGLE

[75] Inventor: Edwin K. Shenk, Westford, Mass.

[73] Assignee: Polaroid Corporation, Cambridge, Mass.

[21] Appl. No.: 158,472

[22] Filed: Jun. 11, 1980

Related U.S. Application Data

[63] Continuation of Ser. No. 965,404, Dec. 1, 1978, abandoned.

[51] Int. Cl.³ .......................... G03B 19/18; G03B 3/00
[52] U.S. Cl. ...................................... 354/401; 352/93; 352/140
[58] Field of Search .................. 352/140; 354/25, 195, 354/198, 401

[56] References Cited

U.S. PATENT DOCUMENTS 3,522,764  8/1970  Biber et al. .......................... 354/195
4,103,309  7/1978  Massa ............................... 352/140 X Primary Examiner—L. T. Hix
Assistant Examiner—David M. Gray
Attorney, Agent, or Firm—John J. Kelleher

[57] ABSTRACT

An autofocusing motion picture camera having an adjustable focus zoom lens and having means for periodically determining the distance to subjects within the focusing range of said lens is provided with an object presence sensing transducer having an acceptance angle that encompasses the optical field of view angle of said lens whenever the telephoto lens position is selected.

5 Claims, 6 Drawing Figures

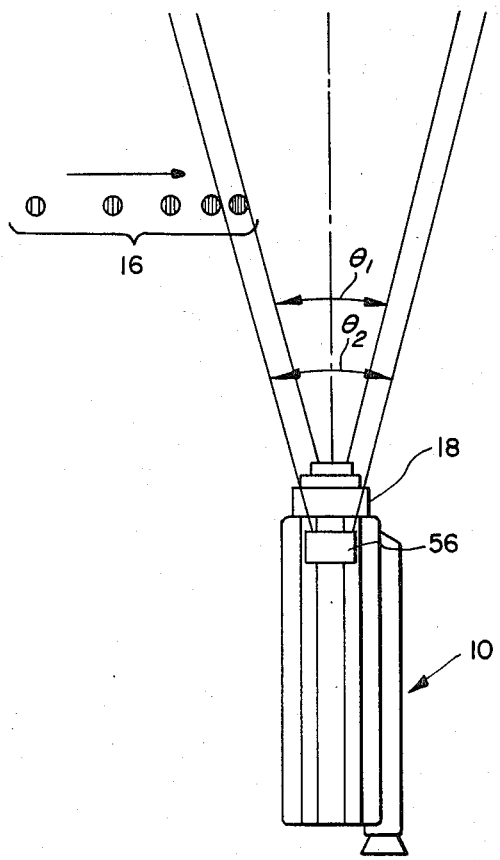
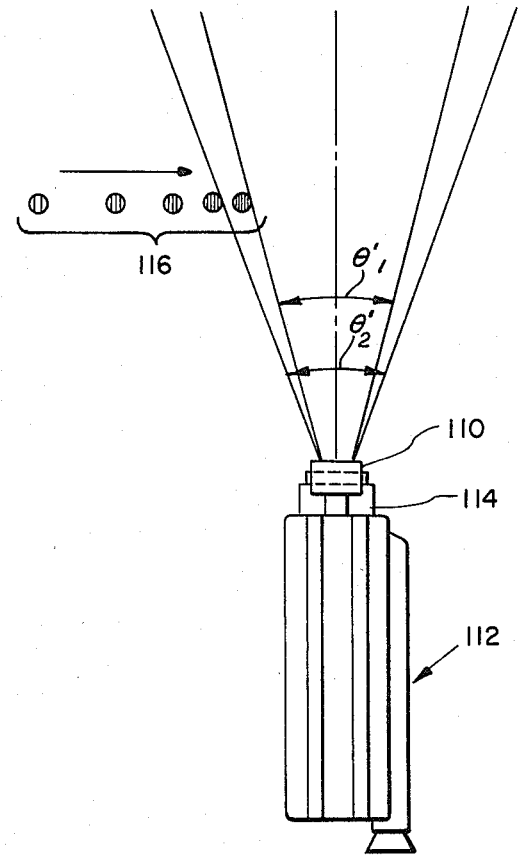
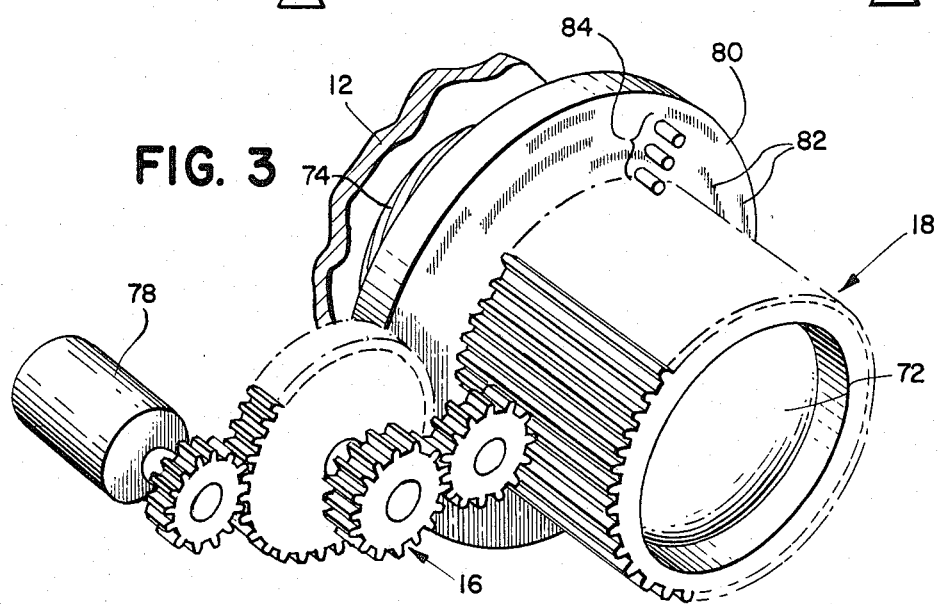

EXTENDED SONIC ACCEPTANCE ANGLE

This is a continuation of application Ser. No. 965,404, filed Dec. 1, 1978, now abandoned.

BACKGROUND OF THE INVENTION

1. Field of the Invention

The present invention relates to an autofocusing motion picture camera having an adjustable focus zoom lens and having means for periodically determining the distance to subjects to be photographed in general, and to such a camera having a highly directional, object presence detecting transducer, in particular.

2. Description of the Prior Art

Photographic cameras incorporating control systems that automatically position the movable element of an adjustable focus lens of said camera to a position where an image of a remote object is in focus at the image plane of said camera in response to a signal representative of the distance to said remote object, have been disclosed in the prior art. Control systems of this type that include object sensing, highly directional transducers for sensing the presence of objects to be photographed remote from said photographic camera are also known in the prior art.

The lens of a camera, as well as other optical instruments has a characteristic viewing angle associated with same that spans the area that is visible through said lens and is generally referred to as the lens' optical field of view angle. In an adjustable focus zoom lens, this characteristic viewing angle is adjustable between a wide angle position at one end of its zooming range where said viewing angle is relatively wide and a telephoto position at the other end of its zooming range where said viewing angle is relatively narrow. Similarly, a highly directional, object presence detecting transducer for use in a control system in an autofocusing camera of the type described above also has a characteristic sensing angle associated with the transducer that spans a region within which the presence of an object can be detected and that angle is referred to herein as the transducer acceptance or main lobe angle.

When selecting the size of the transducer acceptance angle for the adjustable focus lens control system transducer, normal practice is to select an angle that is substantially smaller than the field of view angle of its associated adjustable focus lens, said acceptance angle usually being in the neighborhood of 10% of said field of view angle. If the acceptance angle of the control system transducer was greater than the field of view angle of the adjustable focus lens that it helps to focus, a spurious object presence detection signal would be generated by objects located outside of the adjustable focus lens optical field of view which were closer to said control system transducer than objects located within said optical field of view, which might result in a misfocused adjustable focus lens. This problem is avoided by selecting an object presence sensing transducer with a relatively narrow acceptance angle in accordance with the criteria mentioned above.

In a zoom type adjustable focus lens, the optical field of view of said lens is adjustable between wide angle and telephoto positions, having relatively wide and narrow optical fields of view angles, respectively, as previously mentioned. Standard design practice, as discussed above, would dictate that the transducer acceptance angle for the adjustable focus lens control system transducer should be in the neighborhood of 10% of the narrowest (telephoto) field of view angle of said zoom type adjustable focus lens to avoid the spurious signal problem mentioned above.

One disadvantage with requiring that a transducer acceptance angle be in the neighborhood of 10% of the field of view angle of the adjustable focus lens that it helps to focus is that a zoom type adjustable focus lens would require a transducer with a variable acceptance angle. While it is possible to vary the acceptance angle of a transducer, it would normally result in a more complex arrangement than would be necessary if the transducer acceptance angle remained fixed.

Another disadvantage in selecting a transducer acceptance angle for a transducer in a zoom type adjustable focus lens control system that is in the neighborhood of 10% of the narrowest field of view of said lens is that such an acceptance angle would be substantially less than 10% of the widest (wide angle) field of view of said lens which might result in delayed focusing or the misfocusing of said zoom type adjustable focus lens when the wide angle zoom lens position is selected. This might occur because of a delay or the inability to sense objects within the wide angle field of view of said lens.

SUMMARY OF THE INVENTION

In accordance with the teachings of the present invention, an autofocusing motion picture camera having a zoom type adjustable focus lens with a telephoto field of view angle equal to $\theta_1$ and having means for periodically determining the distance to subjects within the focusing range of said adjustable focus lens is provided with a focus control system that includes a directional, object sensing device having an acceptance angle defining a region within which the presence of an object can be detected and said acceptance angle, which is equal to $\theta_2$, encompasses said telephoto field of view angle $\theta_1$ of said zoom type adjustable focus lens when the telephoto position of said lens is selected. With acceptance angle $\theta_2$ of said object sensing device encompassing the telephoto field of view angle $\theta_1$ of said adjustable focus lens, a subject either within or entering said telephoto optical field of view of said lens will be in focus sooner or for a longer period of time than such a subject would be if said acceptance angle $\theta_2$ was a small percentage of said telephoto field of view angle $\theta_1$, which will result in a more visually pleasing telephoto motion picture of said subject.

BRIEF DESCRIPTION OF THE DRAWINGS

FIG. 3 is a perspective view of the drive means for the zoom type adjustable focus lens depicted in FIG. 1.

FIG. 5A is a top view of a motion picture camera having a zoom type adjustable focus lens and having an object sensing transducer mounted thereon showing said lens in its telephoto position and showing said transducer mounted behind said lens such that the acceptance angle of said transducer encompasses the telephoto optical field of view of said lens.

FIG. 5B is a top view of a motion picture camera having a zoom type adjustable focus lens and having an object sensing transducer mounted thereon showing said lens in its telephoto position and showing said transducer mounted above said lens such that the acceptance angle of said transducer exceeds the telephoto optical field of view of said lens.

DESCRIPTION OF THE PREFERRED EMBODIMENTS

Figure 1:
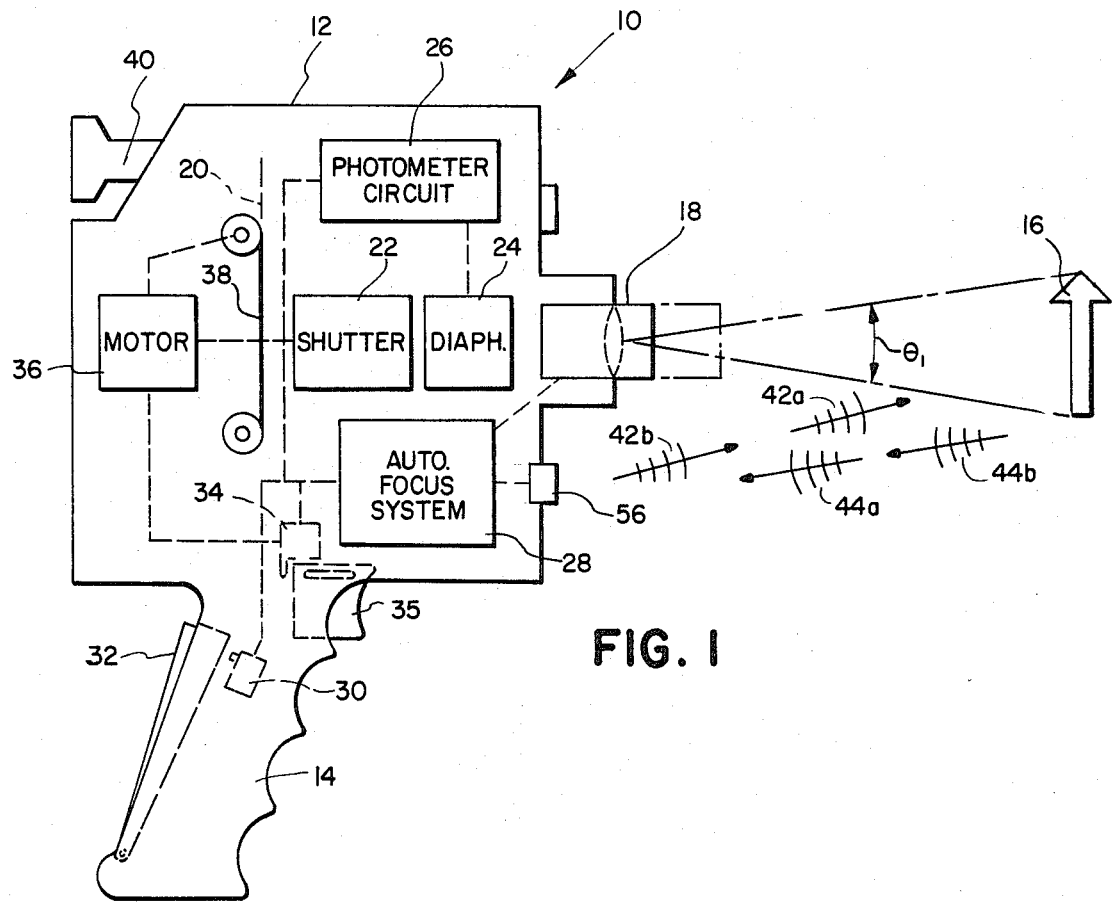
FIG. 1 is a side view, in elevation, of a zoom type adjustable focus lens, automatic focusing motion picture camera incorporating the inventive concept of the present invention.

Referring now to the drawings and, specifically, to FIG. 1, a schematic diagram of automatic focusing camera 10 constructed in accordance with a preferred embodiment of the present invention is depicted. Camera 10 comprises a housing 12 having a handle 14 projecting from the bottom thereof by which a user holds said camera 10 to photograph subject 16 through zoom type adjustable focus lens mount 18 which directs scene light to image plane 20 when shutter mechanism 22 is operated. Zoom type adjustable focus lens mount 18 is adjustable between a wide angle position where the lens system mounted therein has a relatively wide optical field of view and a telephoto position where said lens system has a relatively narrow field of view. Diaphragm 24 associated with shutter mechanism 22, in conjunction with lens mount 18, establishes the instantaneous amount of light incident on image plane 20. The opening of diaphragm 24 is controlled by photometer circuit 26 in response to available scene light.

Mounted within said housing 12 is automatic focusing system 28 which, when activated, is responsive to the distance to subject 16 from camera 10, and to changes in said distance for adjusting the focus position of lens mount 18 in order to maintain an image of subject 16 in focus in image plane 20. Switch 30, which is mounted in camera handle 14 and is connected to an energy source (not shown), controls the operation of photometer circuit 26 and automatic focus system 28 in response to a minimum amount of pivotal movement of actuator 32 as the handle 14 is engaged by the heel of a user's hand when holding camera 10 in position to record a scene. Additionally, switch 30 couples said energy source (battery) to motor run switch 34 to permit scene recording as explained below.

Housing 12 also contains motor 36 which, when energized through motor run switch 34, simultaneously operates shutter 22 and a film indexing claw (not shown) which intermittently drives film 38 past an image recording station located behind shutter 22. Finally, a viewfinder 40 is provided to enable a camera user to frame the scene being filmed.

In the operation of camera 10, the user grasps handle 14 and frames subject 16 by means of viewfinder 40. As the user holds handle 14, switch 30 is closed by the movement of actuator 32 thereby powering photometer circuit 26 and automatic focus system 28. Photometer circuit 26 establishes the proper diaphragm opening in accordance with the amount of light in the scene being photographed while automatic focus system 28 ultrasonically determines the distance to subject 16 and then focuses zoom type adjustable focus lens mount 18 such that the lens system in said lens mount 18 focuses an in-focus image of subject 16 at image plane 20 when shutter 22 is activated to the open position. The distance to subject 16 is determined by measuring the time it takes for an ultrasonic burst of energy to travel from autofocus system 28 to subject 16 and to be reflected back to said autofocus system 28 from said subject 16. Reference numerals 42a and 42b designate sequential ultrasonic bursts of energy being transmitted toward subject 16 and reference numerals 44a and 44b designate the reflection of these ultrasonic bursts of energy from subject 16 toward autofocus system 28. In this particular ultrasonic focusing system, an ultrasonic burst of energy is transmitted and an echo of said transmitted burst of ultrasonic energy is received before a subsequent burst of range-determining ultrasonic energy is transmitted. The ultrasonic rangefinder portion of autofocus system 28 is described in greater detail in my copending U.S. patent application Ser. No. 916,114 (now U.S. Pat. No. 4,199,244).

As discussed above, autofocus system 28 determines the time interval between the transmission of an ultrasonic burst of energy 42a and the return of its echo 44a for the purpose of determining the distance of subject 16 from camera 10. Having established this distance, system 28, when permitted to do so, moves lens mount 18 toward a focus position in which an image of subject 16 will be in focus at focal plane 20 when shutter 22 is activated. As briefly mentioned above, activation of shutter 22 is selectively carried out when the user depresses trigger 35 thereby closing switch 34 and powering motor 36. Autofocus system 28 remains in operation so long as the user maintains his grasp of the handle 14 and is effective to continuously determine subject range and to cause lens mount 18 to track changes in subject distance both prior to and during filming.

Figure 2:
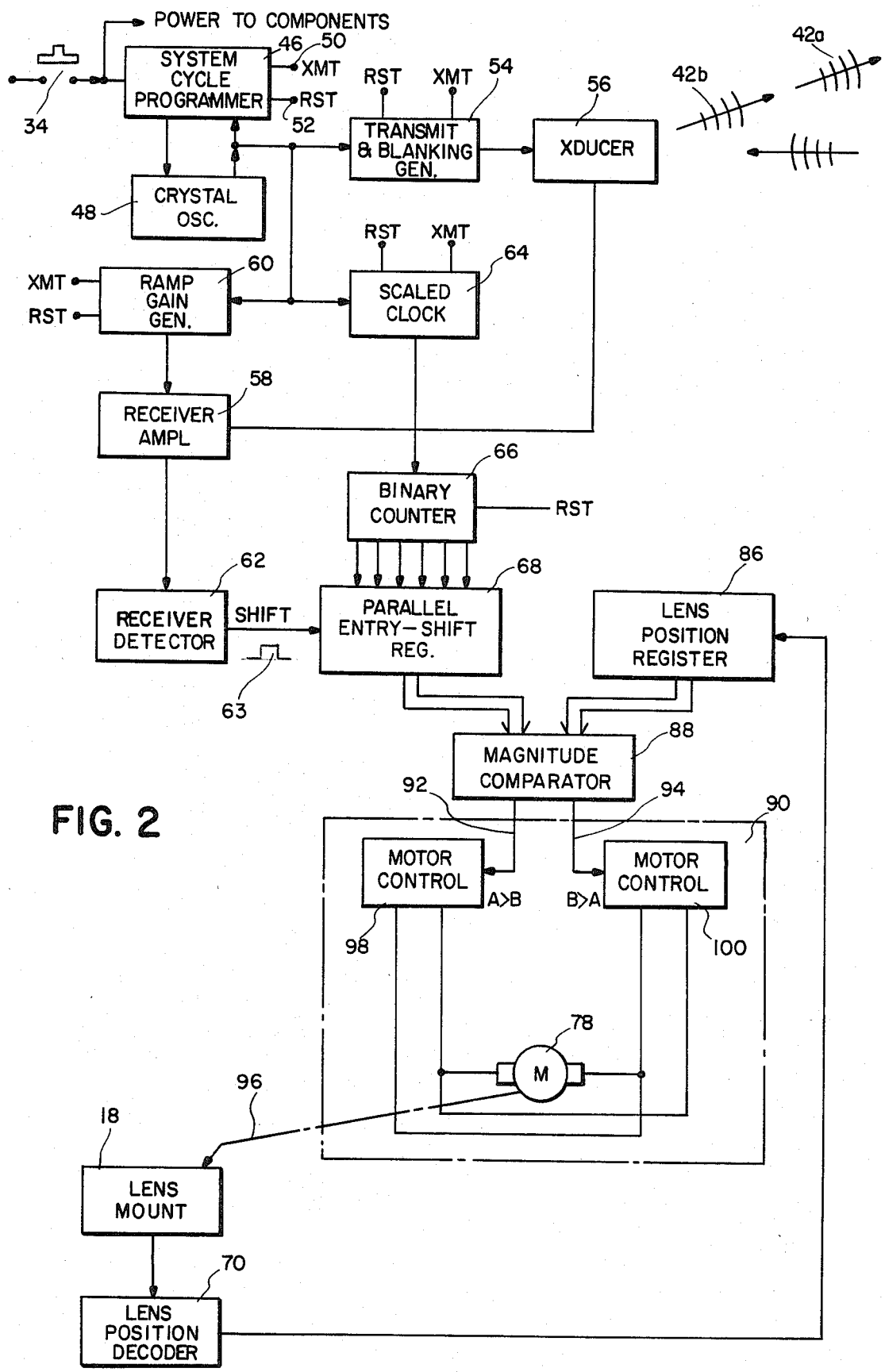
FIG. 2 is a block diagram of the zoom type adjustable focus lens, autofocus system depicted in FIG. 1.

Certain details of automatic focus system 28 are shown in FIG. 2, to which reference is now made. When switch 34 is closed, power is applied to the components of autofocus system 28 (FIG. 1) which causes system cycle programmer 46 to divide-down the high frequency output of oscillator 48 into a transmit and reset pulse train having the same pulse repetition frequency, but shifted in phase. Each pulse of the transmit pulse train produced at output 50 is designated XMT. The reset pulse train produced at output 52, and designated RST, is the same as the XMT pulse train but is delayed with respect to the XMT pulses by about 65 ms, which is greater than the round trip time for sonic energy, under normal conditions of temperature and pressure, for subjects at a distance of about 24 feet from camera 10 (FIG. 1) which represent hyperfocal lens position of the lens system mounted in lens mount 18 (FIG. 1). This arrangement will allow any echo from a subject within 24 feet of said camera to be received by system 28 in the time interval between successive RST pulses.

Transmit and blanking generator 54, to which the XMT pulses and the output of oscillator 48 are applied, operate similar to the corresponding component in the ultrasonic ranging system disclosed in copending application Ser. No. 840,802, filed Nov. 11, 1977 in the name of JUERG MUGGLI, which causes transducer 56 to transmit periodic ultrasonic bursts of energy, two of which are illustrated at 42a and 42b. An echo from a subject due to ultrasonic burst of energy 42a, indicated at 44a, is received by transducer 56 where the echo, in the form of an electrical signal, is routed to receiver amplifier 58 in the manner described in the above-mentioned MUGGLI application. Amplifier 58 has a ramp gain characteristic controlled by ramp gain generator 60 to increase the sensitivity of autofocus system 28 (FIG. 1) to distant subjects. The output of amplifier 58 is detected by receiver detector 62 to produce an echo pulse 63 such that the time between a transmit pulse and its associated echo pulse is proportional to the distance between a subject and camera 10.

This above-noted time interval is utilized in conjunction with scaled clock 64 to establish a number representative of the desired focus position for lens mount 18 (FIG. 1). The output of scaled clock 64 is a train of pulses whose pulse repetition frequency varies with time in accordance with the derivative of the lens/subject function of the lens system associated with lens mount 18 (FIG. 1). The output of scaled clock 64 is integrated by accumulating the pulses produced by said scaled clock, in binary counter 66; the contents of counter 66 at any instant in time represents the integral of the time derivative of the lens/subject function evaluated from the time of transmit pulse XMT to said instant in time. Consequently, the contents of counter 66, when echo pulse 63 occurs, is a definite integral of the time derivative of the lens/subject function of the zoom type adjustable focus lens system associated with lens mount 18 (FIG. 1), which is a number representing the desired focus position of said lens mount 18 for a subject whose distance is determined by the time interval between transmit pulse XMT and echo pulse 63.

By means of receiver detector 62, echo pulse 63 triggers parallel entry/shift register 68 causing the shifting of the contents of counter 66, at the instant of echo pulse 63, into shift register 68. Shortly after echo pulse 63 occurs, reset pulse RST appears at output 52 of system cycle programmer 46 thereby resetting scaled clock 64, binary counter 66, ramp gain generator 60 and transmit and blanking generator 54. The condition of autofocus system 28 is now such that upon the generation of the next ultrasonic burst of energy in response to the next transmit pulse XMT from system cycle programmer 46, the cycle of operation described above will be repeated so that, upon the generation of the next echo pulse 63, the contents of counter 66 will again be shifted into register 68. As a consequence, the number in register 68 repeatedly varies in response to changes in subject distance at a rate dependent upon the pulse repetition rate of transmit pulse XMT.

For determining the actual position of lens mount 18, lens position decoder 70 is provided and is described in detail with respect to FIG. 3. Reference is now made to FIG. 3 which shows the preferred form of lens position decoder 70. As shown in FIG. 3, lens mount 18 carrying objective lens 72 is rotatably mounted on threaded member 74 carried by the camera housing 12 so that rotational movement of lens mount 18 causes axial displacement of objective lens 72. Actually, the pitch of threaded member 74 is selected such that considerably less than 360° is required to displace lens 72 from its extreme close-up axial position to its infinity or hyperfocal axial position. In order to rotate lens mount 18, a gear train 76 is interposed between the motor 78 and the gear teeth carried by the periphery of lens mount 18. A slip clutch connection (not shown) is interposed between motor 78 and lens mount 18 to permit overrunning of the motor 78 in the event of a jam or engagement of the lens mount with an axial movement limiting stop at either end of lens mount travel. Projecting from and rotatable with lens mount 18 is encoder disc 80, carrying shaft encoding indicia 82 in the form of binary coded slots that pass completely through said disc 80. Encoding indicia 82 are preferably in the form of a gray code. However, for ease of description, a standard three-bit binary code is utilized. Operatively associated with indicia 82 are three photocells 84 and three light sources (not shown). The light path between a light source and its associated photocell is blocked and unblocked by slotted encoder disc 80 as said disc is rotated through said light path. The output of each photocell provides one bit of information on the angular and therefore the axial position of lens mount 18.

Turning again to FIG. 2, the output of lens position decoder 70 is applied to lens position register 86 which constitutes means responsive to the position of said lens mount 18 for generating a number representative of the actual position of said lens mount. Continuing now with the operation of the embodiment of FIG. 2, parallel entry/shift register 68 is a first register of autofocus system 28 (FIG. 1) and stores a number representative of the desired focus position for lens mount 18, the contents of this first register varying in response to changes in subject distance at a rate dependent upon the pulse repetition rate of the transmit pulses as previously discussed. Lens position register 86 constitutes a second register of autofocus system 28 which stores a number representative of the actual position of lens mount 18, the contents of register 86 varying in response to changes in lens mount 18 position at a rate determined by the rate of change of lens mount 18 position. The rate of change of the contents of register 86 is thus independent of the rate at which the contents of register 68 are updated.

The contents of registers 68 and 86 are compared in magnitude comparator 88 to determine, on a continuous basis, which register contains the larger number. Since each register number is based on the same reference (i.e., the desired focus position and the actual lens position are measured from the same reference point), the contents of the register will be equal when the actual position of lens mount 18 corresponds to the desired focus position for said lens mount 18. When the contents of one register exceeds the other, the actual position of lens mount 18 will be displaced from its last focus position by an amount equal to the difference between the contents of each such register. Whether the actual position of lens mount 18 is on one side or the other of the desired focus position will depend upon which register contains the larger number. With knowledge of the existance of a difference in contents as well as identification of the register with the larger number, drive means 90 is responsive to the output of magnitude comparator 88, causing lens mount 18 to track changes in subject distance.

Comparator 88 has first and second output terminals 92 and 94. A signal appears on first terminal 92 only when the number in first register 68 exceeds the number in second register 86. If the numbers in the registers are designated A and B, then a signal will appear on terminal 92 when A is greater than B. Ordinarily, a signal will appear on second terminal 94 only when the reverse relation between the magnitudes occurs, namely B greater than A.

Drive means 90 includes reversible drive motor 78 operatively associated with lens mount 18 through mechanical connection 96, a forward motor control 98 and a reverse motor control 100. The forward motor control 98 is responsive to a signal on first terminal 92 for operating motor 78 in one direction to thereby move the lens mount in one direction so as to increase the number in register 86 and thereby tend to null the signal on terminal 92. Whether or not a null condition is actually reached depends on what is concurrently happening to the contents of register 68. This, of course, depends upon changes in subject distance.

Similarly, a signal on second terminal 94 causes reverse drive motor control 100 to operate motor 78 in the opposite direction, thereby moving the lens mount in the opposite direction to thereby decrease the number in register 86. This particular movement should tend to nullify the signal on terminal 94 if the subject remains stationary. When no signal appears on either terminal 92 or terminal 94, neither controls 98 nor 100 are operated and motor 78 remains stationary. As indicated above, this condition exists when the actual and desired focus positions for lens mount 18 are the same.

As subject distance changes, the time intervals between successive transmit pulses XMT and echo pulses 63 change in direct relationship thereby causing shifting of the contents of counter 66 into register 68 at a different point in time measured from the beginning of each initiation of the operation of scaled clock 64. The number in register 68 thus changes and the output of comparator 88 reflects this change, causing motor controls 98 or 100 to operate in such a manner as to reduce the difference between the contents of registers 68 and 86 as the actual position of lens mount 18 approaches the desired focus position for said lens mount 18.

Optical systems of circular cross section have a conical optical field of view that is defined by the angle at the apex of the cone defining said optical field of view. In the zoom type adjustable focus lens mounted in lens mount 18, schematically shown in FIG. 1, this optical field of view angle is equal to the angle $\theta_1$ when said lens is adjusted to its telephoto position. With continued reference to FIG. 1, autofocus system 28 depicted therein includes transducer 56 for transmitting an ultrasonic burst of energy toward and receiving an echo of said ultrasonic burst of energy from a subject to be photographed, such as subject 16. Transducer 56 is highly directional and is of the type described in co-pending application Ser. No. 840,802, filed Oct. 11, 1977 in the name of MUGGLI (now U.S. Pat. No. 4,199,246). Transducer 56 transmits a burst of acoustical energy in a multiple lobe pattern that includes a main or principal lobe that is similar in shape to the optical field of view of the zoom type adjustable focus lens in lens mount 18. The approximate multiple lobe acoustical energy pattern of transducer 56 is depicted in FIG. 4.

Figure 4:
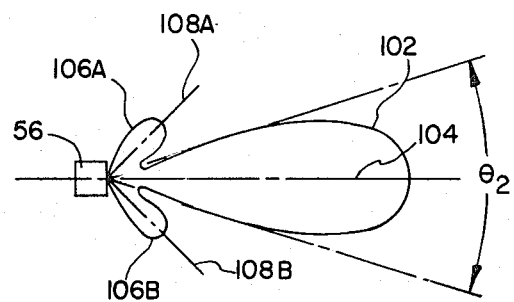
FIG. 4 is a beam or lobe pattern of a directional, object sensing transducer of the type schematically depicted in FIG. 2, showing transducer sensitivity as a function of the angle from the principal or main lobe axis of said transducer.

FIG. 4 depicts the multiple lobe acoustical energy transmission pattern of ultrasonic transducer 56 that is utilized in autofocus system 28 of camera 10, in FIG. 1. Most of the acoustical energy transmitted by transducer 56 is included within main lobe 102, said lobe 102 forming a generally symmetrical pattern about object distance axis 104. Main lobe 102 is defined herein by the angle $\theta_2$. The presence of objects located within lobe 102 will be detected by acoustical transducer 56. In addition to main lobe 102, secondary lobes 106a and 106b that form a generally symmetrical pattern about secondary object distance axes 108a and 108b, respectively, will detect the presence of objects within said secondary lobes 106a and 106b. Other smaller lobes are generated by transducer 56 that are both smaller and are at a greater angular distance from object distance axis 104 than either secondary object distance axes 108a or 108b but, for ease of description, these lobes have been omitted from FIG. 4. The volume of space encompassed by lobe 102 can be several orders of magnitude greater than the volume of space encompassed by lobes 106a and 106b and therefore objects located on or near secondary object distance axes 108a or 108b must be substantially closer to transducer 56 than objects located on or near object distance axis 104 in order to have their presence detected by said transducer 56. Angle $\theta_2$, encompassing virtually all of main lobe 102, is herein defined as the acceptance angle of acoustical transducer 56.

Transducer 56 is of the highly directional type, said transducer having an acceptance angle of $\theta_2$, as previously discussed. As previously noted, the adjustable focus lens in lens mount 18 of camera 10 (FIG. 1) has an optical field of view angle equal to $\theta_1$ when said lens is adjusted to its telephoto position. In prior art autofocus motion picture cameras having object presence sensing transducers such as transducer 56, the acceptance angle of these transducers have been chosen such that they encompass a relatively small portion of the optical field of view of the adjustable focus lens that they help to focus. As previously mentioned, the reason for so restricting the transducer acceptance angle was to avoid misfocusing errors that might occur as a result of objects projecting into the optical field of view of the adjustable focus lens which a photographer did not want to focus on and/or photograph; a restriction that, in a zoom type adjustable focus lens, would require a transducer with a variable acceptance angle. However, if the transducer acceptance angle remains narrow, but encompasses the entire telephoto (narrowest) field of view of its associated zoom type adjustable focus lens, the chances of a spurious object presence reflection signal from an object located within or slightly outside of said telephoto field of view causing said zoom type adjustable focus lens to be misfocused would be minimal. This is so because a transducer with a narrow acceptance angle would present a relatively small target or volume of space for such an object to enter. The advantages flowing from not restricting the size of the transducer acceptance angle with respect to the telephoto field as it is in the wide angle field of view in said zoom lens include the lack of a requirement for a transducer with a variable acceptance angle, and an autofocus control system that can anticipate the movement of a subject into a camera's telephoto field of view and can more quickly bring such a subject into focus with an enhanced visual effect.

Transducer acceptance angel $\theta_2$ may either equal or exceed optical field of view angle $\theta_1$ so long as the transducer is positioned on the camera such that its acceptance angle encompasses the optical field of view angle of its associated adjustable focus lens.

In the preferred transducer mounting arrangement, which is illustrated in FIG. 5A, transducer 56 having an acceptance angle of $\theta_2$ equal to telephoto field of view angle $\theta_1$, is mounted on top of camera 10 in a position that is further away from subject to be photographed 16 than adjustable focus lens mount 18. In this position, acceptance angle $\theta_2$ encompasses telephoto field of view angle $\theta_1$ and is able to detect the presence of subject 16, as it moves from left to right as viewed in FIG. 5A, before it enters the telephoto field of view of the adjustable focus lens in lens mount 18 that is defined by the angle $\theta_1$. As soon as the presence of subject 16 is detected by transducer 56, the automatic focus control system causes motor 78 (FIG. 3) to initiate the positioning of the adjustable focus lens towards the proper subject-in-focus position.

In an alternate embodiment, which is illustrated in FIG. 5B, transducer 110, having an acceptance angle of $\theta_2'$ that is greater than telephoto field of view angle $\theta_1'$, is mounted on top of motion picture camera 112 and directly above adjustable focus lens mount 114. In this position, acceptance angle $\theta_2'$ encompasses telephoto field of view angle $\theta_1'$ and is also able to detect the presence of subject 116, as it moves from left to right as viewed in FIG. 5B, before it enters the telephoto field of view of the zoom type adjustable focus lens in lens mount 114 that is defined by the angle $\theta_1'$.

GENERAL CONSIDERATIONS

In the preferred embodiment, the acceptance angle of the object presence detecting transducer has been defined as encomapssing the telephoto field of view angle of the zoom type adjustable focus lens that it helps to focus. Considerations effecting the degree to which the transducer acceptance angle must encompass the field of view angle of its associated adjustable focus lens include the sluing rate of the lens drive mechanism, the avoidance of excessive focusing speed and the possibility of focusing on objects substantially beyond the telephoto field of view of said zoom type adjustable focus lens.

In the preferred embodiment, object presence sensing transducer 56 has been described as being of the acoustical type and means have been described for utilizing such a transducer in a sonically focused movie camera. The present invention can be utilized with other object presence sensing transducers having directional sensitivity such as one utilizing radiant energy for object presence detection.

The term "encompass" as utilized herein to define the acceptance angle of an object presence sensing transducer includes either the terms "equal to" or "greater than" when used to describe said acceptance angle. The acceptance angle may be "equal to" the telephoto optical angle if the transducer is mounted substantially behind the lens as shown in FIG. 5A, but must be greater than the telephoto optical angle is said transducer is mounted above the lens as shown in FIG. 5B.

The zoom type adjustable focus lens described herein is preferably of the manually actuated type. However, a power actuated zoom type adjustable focus lens may also be employed.

It will be apparent to those skilled in the art from the foregoing description of my invention that various improvements and modifications can be made in it without departing from its true scope. The embodiments described herein are merely illustrative and should not be viewed as the only embodiments that might encompass my invention.

What is claimed is:

1. An autofocusing motion picture camera comprising:

means for selectively coupling said camera to a source of energy;

an image plane;

a lens assembly including an adjustable focus lens mounted for displacement over a given operational range where it serves to focus images at said image plane of subjects positioned within a range of subject distances and including optical angle varying means for varying the optical field of view of said lens assembly between a wide angle position and a telephoto position, said lens assembly having an optical field of view angle equal to $\theta_1$ when the optical angle of said lens assembly is varied to its said telephoto position;

means including a transducer having an acceptance angle equal to $\theta_2$ for periodically sensing the range of a subject encompassed by said acceptance angle and for producing a signal indicative of said range, said transducer acceptance angle $\theta_2$ encompassing said optical field of view angle $\theta_1$ when said adjustable focus lens is positioned to its telephoto position where its optical field of view angle equals $\theta_1$; and means responsive to said range signal for optimally displacing said adjustable focus lens to the focal position corresponding to the range of said sensed subject in anticipation of said subject entering the space encompassed by said telephoto optical field of view angle $\theta_1$ as soon as said subject enters the space encompassed by transducer acceptance angle $\theta_2$.

2. The camera of claim 1, wherein said transducer acceptance angle $\theta_2$ is greater than said lens assembly telephoto optical field of view angle $\theta_1$.

3. The camera of claim 1, wherein said means for periodically sensing said subject range includes an object sensing directional electroacoustical transducer having a main beam angle equal to acceptance angle $\theta_2$.

4. The camera of claim 3, wherein said transducer is mounted immediately above said variable lens assembly.

5. The camera of claim 3, wherein said transducer is mounted behind and further away from a subject to be photographed than said variable lens assembly.

* * * * *